US 6,592,981 B1

(12) United States Patent
Rawal et al.

(10) Patent No.: US 6,592,981 B1
(45) Date of Patent: Jul. 15, 2003

(54) OXIDATION RESISTANT INSULATING SANDWICH TILES

(75) Inventors: Suraj P. Rawal, Littleton, CO (US); Frank M. Kustas, Parker, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 151 days.

(21) Appl. No.: 09/620,737

(22) Filed: Jul. 20, 2000

Related U.S. Application Data

(63) Continuation-in-part of application No. 09/368,917, filed on Aug. 5, 1999.
(60) Provisional application No. 60/145,167, filed on Jul. 22, 1999, and provisional application No. 60/095,674, filed on Aug. 7, 1998.

(51) Int. Cl.[7] ............................................. B32B 3/26
(52) U.S. Cl. ....................... 428/312.8; 428/293.4; 428/299.1; 428/304.4; 428/408; 428/689; 428/698; 428/704; 428/634; 244/158 A; 244/160
(58) Field of Search ...................... 428/312.8, 304.4, 428/688, 689, 697, 698, 704, 634, 293.4, 299.1, 408; 244/158 A, 160

(56) References Cited

U.S. PATENT DOCUMENTS

| | | | | |
|---|---|---|---|---|
| 3,135,297 A | | 6/1964 | Nordberg et al. ............ 138/144 |
| 3,137,602 A | | 6/1964 | Lincoln ......................... 156/89 |
| 3,203,849 A | | 8/1965 | Katz et al. ..................... 161/96 |
| 3,407,110 A | | 10/1968 | Axelson et al. ............... 161/68 |
| 3,475,262 A | | 10/1969 | Sargent et al. ................. 161/68 |
| 3,617,416 A | | 11/1971 | Kromrey .................... 156/173 |
| 4,016,322 A | * | 4/1977 | Haldeman ................... 428/246 |
| 4,054,477 A | | 10/1977 | Curran ....................... 156/197 |
| 4,100,322 A | | 7/1978 | Seibold et al. ............... 428/257 |
| 4,124,732 A | | 11/1978 | Leger ............................ 428/77 |
| 4,151,800 A | | 5/1979 | Dotts et al. ................. 102/105 |
| 4,201,611 A | | 5/1980 | Stover ......................... 156/155 |
| 4,215,161 A | | 7/1980 | Seibold et al. ............... 427/228 |
| 4,515,847 A | | 5/1985 | Taverna et al. .............. 428/107 |
| 4,686,128 A | | 8/1987 | Gentilman ..................... 428/44 |
| 4,713,275 A | | 12/1987 | Riccitiello et al. ............ 428/76 |
| 4,767,656 A | | 8/1988 | Chee et al. .................. 428/116 |
| 4,892,783 A | * | 1/1990 | Brazel ......................... 428/282 |
| 5,151,216 A | | 9/1992 | Liu ............................. 252/307 |
| 5,291,830 A | | 3/1994 | Zwan .......................... 102/293 |
| 5,310,592 A | * | 5/1994 | Baker et al. ................. 428/117 |
| 5,362,567 A | * | 11/1994 | Washburn et al. ........... 428/408 |
| 5,413,859 A | | 5/1995 | Black et al. ................. 428/408 |
| 5,511,747 A | | 4/1996 | Parrot et al. ................ 244/158 |
| 5,540,996 A | | 7/1996 | Tanzilli et al. .............. 428/408 |
| 5,547,628 A | | 8/1996 | Lacombe et al. ............ 264/257 |
| 5,560,569 A | | 10/1996 | Schmidt ...................... 244/117 |
| 5,626,951 A | | 5/1997 | Hogenson ................... 442/262 |
| 5,705,012 A | | 1/1998 | Kolodziej et al. ........... 156/245 |
| 5,736,232 A | | 4/1998 | Shih et al. ................... 428/210 |
| 5,803,406 A | | 9/1998 | Kolodziej et al. ........... 244/158 |
| 5,804,306 A | | 9/1998 | Sorenson et al. ......... 428/297.4 |

* cited by examiner

Primary Examiner—Paul Thibodeau
Assistant Examiner—Christopher Paulraj
(74) Attorney, Agent, or Firm—Marsh, Fischmann & Breyfogle LLP

(57) ABSTRACT

A lightweight insulating sandwich tile (110) having applications such as spacecraft and reusable launch vehicle thermal protection is disclosed. In one embodiment, the lightweight insulating sandwich tile (110) includes an outer structural facesheet (120) that is bonded or co-cured with an inner insulating core (130). The outer structural facesheet (120) is comprised of carbon-carbon and includes an oxidation resistant layer (140) on an outer surface thereof. The oxidation resistant layer (140) may comprise a coating or surface treatment of, for example, $MoSi_2$, amorphous SiCN, amorphous SiCBN, $Ti_3SiC_2$, HfC, $HfO_2$, $HfB_2$, SiC, Ir, and $ZrB_2$. The inner insulating core (130) is comprised of bonded discontinuous carbon fibers, a network of vitreous carbon ligaments, carbon aerogel, or graphite felt or a hybrid combination of these materials.

20 Claims, 4 Drawing Sheets

OXIDATION RESISTANT INSULATING SANDWICH TILES

RELATED APPLICATION INFORMATION

This application is a continuation-in-part of U.S. patent application Ser. No. 09/368,917 entitled "INSULATED REENTRY HEAT SHIELD" filed Aug. 5, 1999 now allowed and claiming the benefit of U.S. Provisional Application Ser. No. 60/095,674 entitled "CARBON-CARBON/INSULATION HEATSHIELD" filed on Aug. 7, 1998. This application also claims the benefit of U.S. Provisional Application Ser. No. 60/145,167 entitled "CARBON-CARBON SANDWICH TILES AS INSULATIVE TPS FOR SPACECRAFT AND RLV APPLICATIONS" filed on Jul. 22, 1999.

FIELD OF THE INVENTION

The present invention generally relates to heat shields, and more particularly, to a lightweight, oxidation resistant insulating sandwich tile for use in spacecraft heat shields and the like.

BACKGROUND OF THE INVENTION

Thermal control of spacecraft surfaces during planetary entry and earth reentry is an important technology that enables accomplishment of the intended mission of the spacecraft (e.g., science gathering, routine access to space, etc.). Previously, protective heat shields have incorporated ablators for the rejection of aerothermal heat loads through the pyrolysis and ablation of the ablative material comprising the ablator.

Traditional protective heat shields have generally consisted of ablatable materials that are impregnated into a honeycomb core structure (for spacecraft), rigid ceramic tiles, or ceramic fibrous tiles. Unfortunately, fabrication of these types of heat shield materials, particularly phenolic impregnated carbon ablator (PICA), has typically not been as re- producible and reliable as desired. Further, rigid ceramic tiles can be relatively expensive to fabricate and suffer from relatively poor toughness and thermal shock resistance. While ceramic fibrous tiles do provide improved toughness and thermal shock resistance over rigid ceramic tiles, they are very expensive to fabricate and can require very long lead times.

SUMMARY OF THE INVENTION

In view of the foregoing, one objective of the present invention is to provide a lightweight, less fabrication sensitive modular thermal protection system (TPS) for use in thermal protection applications such as, for example, spacecraft heat shields.

These and other objectives and advantages are achieved by the inventive materials concept for a lightweight insulating sandwich tile in accordance with the present invention. According to one aspect of the present invention, a lightweight insulating sandwich tile includes a structural facesheet comprised of an ablative first material. An inner insulating core comprised of a second material having low density and low thermal conductivity is attached to an inner surface of the structural facesheet. The lightweight insulating sandwich tile also includes an oxidation resistant outer layer on an outer surface of the structural facesheet. In one embodiment, the oxidation resistant outer layer may comprise a coating applied on the outer surface of the structural facesheet.

The ablative first material may comprise carbon-carbon. In this regard, the carbon-carbon ablative first material may be laid-up in a single ply configuration, or it may be laid-up in a quasi-isotropic configuration. The second material may, for example, comprise bonded discontinuous carbon fibers (e.g., carbon FIBERFORM® commercially available from Fiber Materials, Inc., of Biddeford, Me. or CALCARB™ commercially available from Calcarb, Inc., in Rancocos, N.J.), carbon foam (a network of vitreous carbon ligaments), carbon aerogel or graphite felt. The oxidation resistant outer layer may comprise a coating or surface treatment of, for example, $MoSi_2$, amorphous SiCN, amorphous SiCBN, $Ti_3SiC_2$, HfC, $HfO_2$, $HfB_2$, SiC, Ir, or $ZrB_2$, that is applied on the outer surface of the structural facesheet.

The structural facesheet and the inner insulating core may be attached to one another. In this regard, the structural facesheet and the inner insulating core may be bonded to one another by disposing at least one layer of one of a phenolic loaded scrim cloth or a phenolic loaded felt there between and applying heat to remove phenolic volatiles. The structural facesheet and the inner insulating core may also be attached to one another by co-curing the structural facesheet and the inner insulating core.

To enhance the structural integrity of the lightweight insulating sandwich tile, the inner insulating core may include a plurality of support panels. The support panels may, for example, be comprised of carbon-carbon, bonded discontinuous carbon fibers, and/or a network of vitreous carbon ligaments. Each of the support panels may be oriented in a parallel fashion to one another and substantially orthogonal to the structural facesheet. Sections of lightweight insulating material (e.g., carbon aerogel and/or graphite felt) may be disposed between each of the parallel support panels.

According to another aspect of the present invention, a lightweight insulating sandwich tile includes an outer structural facesheet and an inner insulating core backing the outer structural facesheet. The outer structural facesheet and the inner insulating core may be attached to one another by, for example, disposing at least one layer of one of a phenolic loaded carbon scrim cloth or a phenolic loaded carbon felt there between and applying heat to remove the phenolic volatiles or co-curing the outer structural facesheet and the inner insulating core. The outer structural facesheet is comprised of carbon- carbon (e.g., in a single ply lay-up or a quasi-isotropic lay-up) and includes an oxidation resistant coating or surface treatment on an outer surface thereof. In this regard, the oxidation resistant coating or surface treatment may, for example, comprise $MoSi_2$, amorphous SiCN, amorphous SiCBN, $Ti_3SiC_2$, HfC, $HfO_2$, $HfB_2$, SiC, Ir, or $ZrB_2$,. The inner insulating core backing the outer structural facesheet is comprised of bonded discontinuous carbon fibers, a network of vitreous carbon ligaments, carbon aerogel, and/or graphite felt. The structural integrity of the lightweight insulating sandwich tile may be enhanced by including a plurality of support panels comprised of, for example, carbon-carbon, bonded discontinuous carbon fibers, and/or a network of vitreous carbon ligaments in the inner insulating core. The support panels may be parallel to one another and substantially orthogonal to the outer structural facesheet with sections of lightweight insulating material (e.g., carbon aerogel and/or graphite felt) disposed between each of the parallel support panels.

These and other features and advantages of the present invention will be apparent upon a review of the following detailed description when taken in conjunction with the accompanying figures.

DETAILED DESCRIPTION

Figure 1:
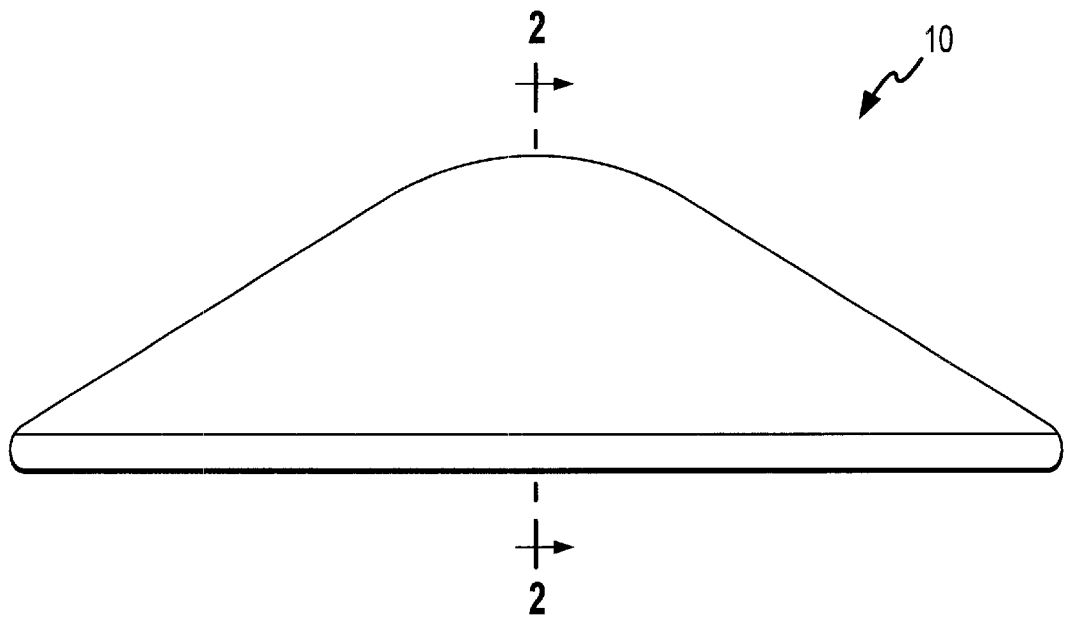
FIG. 1 illustrates a side view of one embodiment of an insulated reentry heat shield in accordance with the present invention.

In FIG. 1, a side view of one embodiment of an insulated reentry heat shield 10 in accordance with the present invention is illustrated. The heat shield 10 may be attached to a spacecraft, such as a sample return capsule, to provide thermal protection for the spacecraft during atmospheric re-entry. Although the shape of the illustrated heat shield 10 is conical, it should be appreciated that the heat shield 10 may be configured in a number of other manners (e.g., cylindrical sections, bullet or nosecap shaped, or rectangular panels and the like for attachment to generally flat surfaces).

Figure 2:
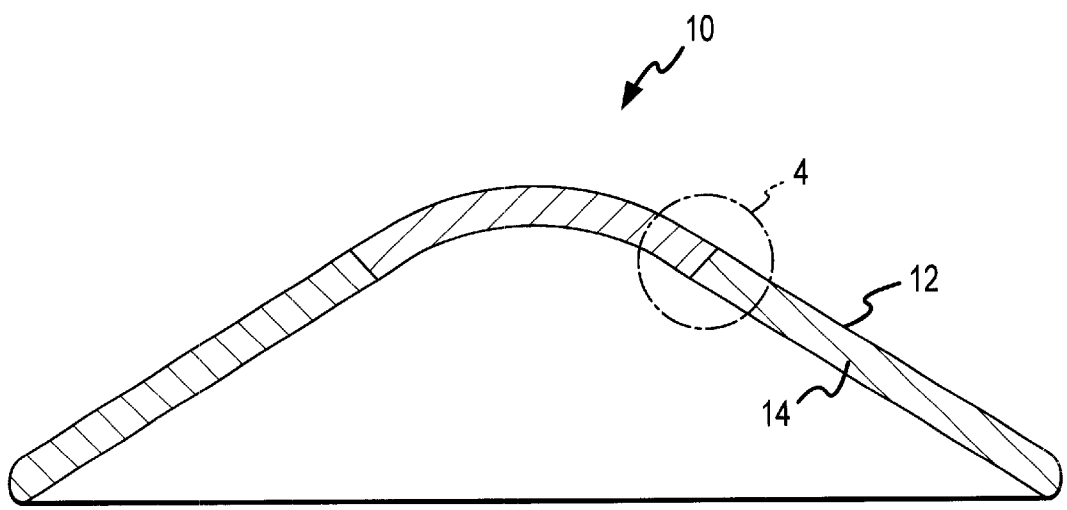
FIG. 2 illustrates a cross-sectional view of the insulated reentry heat shield of FIG. 1 taken along line 2—2 in FIG. 1.
Figure 3:
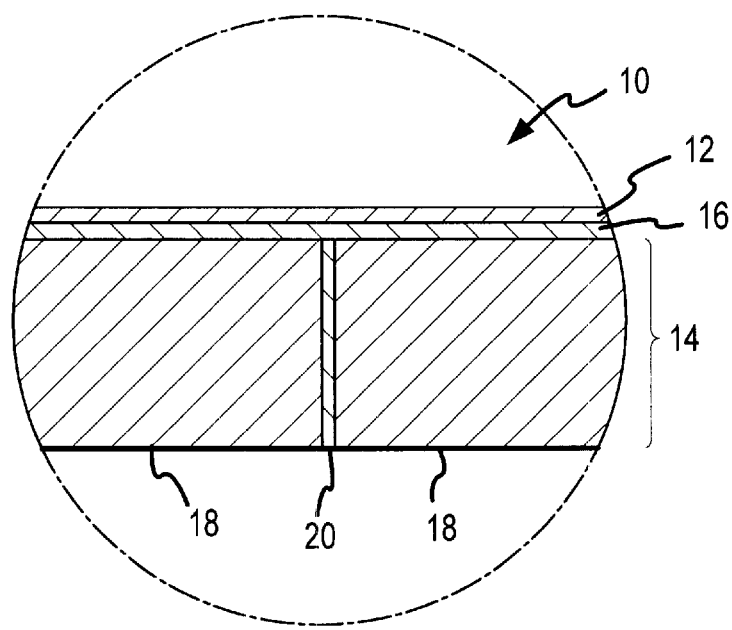
FIG. 3 illustrates a detailed cross-sectional view of the heat shield taken at enlarged area 4 in FIG. 2.

The construction of the heat shield 10 can be seen in the cross-sectional views of FIGS. 2 and 3. The heat shield 10 includes a high temperature heat resistant outer layer 12 backed by a high temperature insulating inner layer 14. The outer layer 12 is comprised of an ablative first material and the inner layer 14 is comprised of a lighter weight insulating second material. The outer and inner layers 12, 14 are bonded to one another by a middle layer 16. The middle layer 16 is formed by disposing one or more layers of a phenolic loaded third material between the outer and inner layers 12, 14 and heating all three layers simultaneously to remove phenolic volatiles from the middle layer 16. As will be further described below, the third material may be a scrim cloth or felt material that has been soaked in phenolic resin.

The outer layer 12 forms a thin continuous outer surface formed to the outer contours of the heat shield 10. The outer layer 12 provides an ablative continuous surface capable of withstanding severe re-entry environments, such as, for example, environments having surface pressures greater than 0.2 atmospheres and heating greater than 200 W/cm$^2$. In the illustrated embodiment, the ablative first material comprising the outer layer 12 is carbon-carbon (e.g. two-dimensional or three-dimensional carbon-carbon laminate). However, it should be appreciated that the outer layer 12 may be comprised of other ablative materials, such as for example, carbon-phenolic and ceramic matrix composite materials, such as for example, silica-loaded materials. The ablative material comprising the outer layer 12 should be appropriate for the anticipated heat flux during re-entry, which, depending upon mission parameters may, for example, be in the range of 100 W/cm$^2$ to 1000 W/cm$^2$.

To ensure that the outer layer 12 is comprised of a fully dense and uniform carbon-carbon matrix, the outer layer 12 preferably undergoes one or more conventionally known carbon matrix densification procedures wherein voids within the carbon-carbon matrix are filled with carbon. The carbon matrix densification procedure(s) may comprise conventionally known processes such as, for example, a vapor deposition process or repeated impregnations of phenolic resin with subsequent heat treatment to remove phenolic volatiles. Filling the voids helps prevent gases from permeating through the outer layer 12 to the inner layer 14 during reentry. Preferably, the carbon-carbon outer layer 12 has a density of at least 1.6 grams per cubic centimeter. To further enhance its capability of withstanding severe reentry conditions, the carbon- carbon outer layer 12 may undergo a conventionally known high temperature graphitization process. The temperature of the graphitization process may be varied depending upon the maximum expected temperature to which the outer layer 12 is expected to be exposed on a given mission. In addition to undergoing carbon matrix densification and high temperature graphitization processes, the outer layer 12 should be sufficiently thick and continuous to provide complete coverage of the inner layer 14 during re-entry. The appropriate thickness for the outer layer 12 varies depending upon mission parameters, such as expected surface pressure and heat flux, that effect the expected amount of surface recession plus an additional margin necessary to ensure that a sufficiently thick outer layer 12 remains throughout reentry in order to protect the inner layer 14 from gas flow through the outer layer 12. For a carbon-carbon outer layer 12, its thickness is preferably between about 0.10 and 0.25 inches.

The insulating inner layer 14 prevents overheating at the interface of the heat shield and the spacecraft (i.e. at the inner surface of the inner layer 14). In this regard, the inner layer 14 should be sufficiently thick in order to maintain the heat shield/spacecraft interface below a desired temperature depending upon the anticipated heat flux for a given mission. The desired temperature at the heat shield/spacecraft interface may be determined, for example, by bond strength requirements between the heat shield 10 and spacecraft structure. Typically as is illustrated, the inner layer 14 will be substantially thicker than the outer layer 12. In this regard, the second material comprising the inner layer 14 should be less dense than the first material comprising the outer layer 12 so that, despite the substantial thickness of the inner layer 14 in comparison to the outer layer 12, the overall weight of the heat shield 10 is minimal. In the illustrated embodiment, the second material may comprise carbon foam (e.g. FIBERFORM®). Other appropriate insulating materials include, for example, reticulated vitreous carbon, graphite felt, ceramic foam, ceramic felt, carbon aerogel and impregnated microspheres of carbon, ceramic or other like metals.

In the illustrated embodiment, the middle layer 16 is formed by disposing one or more layers of phenolic loaded carbon scrim cloth between the outer and inner layers 12, 14. The three layers, 12, 14, 16 undergo a carbonization cycle wherein they are heated to an appropriate temperature (e.g. about 1500° F.) to remove phenolic volatiles from the middle layer. This results in a middle layer comprised of carbon scrim cloth and phenolic char. Carbon scrim cloth is used so that the material comprising the middle layer 16 has a similar chemical composition as both the first material comprising the outer layer 12 (i.e. carbon-carbon) and the second material comprising the inner layer 14 (i.e. carbon foam). The scrim cloth may be loaded with the phenolic resin before it is placed between the outer and inner layers 12, 14 by soaking the scrim cloth in a phenolic resin. The phenolic resin within which the scrim cloth is soaked may have additives such as, for example, graphite fibers or glass frit suspended therein. Such additives help enhance the strength of the bond between the outer and inner layers 12, 14 by providing additional attachment points within the middle layer 16. Using carbon scrim cloth to bond the carbon-carbon outer layer 12 with the carbon foam inner layer 14 provides a compliant bond between the outer and inner layers 12, 14 that can withstand movement without substantial separation between the outer and inner layers 12, 14 as they undergo thermal expansion and other stresses during re-entry. The bond is compliant because all three layers 12, 14, 16 have similar coefficients of thermal expansion due to their carbonaceous nature. Thus, as the heat shield expands and contracts during reentry, all three layers 12, 14, 16 expand and contract at similar rates.

It should be appreciated that when the first and second materials comprising the outer and inner layers 12, 14 are not carbonaceous, a different type of scrim cloth material may be appropriate. For example, if the outer and inner layers 12, 14 are comprised of ceramic ablative and insulating materials, respectively, a ceramic scrim cloth material is appropriate for the middle layer 16. Furthermore, one or more layers of a phenolic loaded felt material (e.g. carbon felt or ceramic felt, as appropriate) may be used instead of phenolic loaded scrim cloth. Such felt material may provide an even more compliant bond between the outer and inner layers 12, 14.

Though the inner layer 14 may be continuous, it may also be comprised of a plurality of individual blocks 18 of the insulating second material, as is illustrated. Each block 18 is bonded to the outer layer 12 by the middle layer 16 and may be machined to match the outer contours of a spacecraft or other mating structure that the heat shield is intended to protect. In addition to being bonded to the carbon-carbon outer layer 12, adjacent blocks 18 may also bonded to one another. Adjacent blocks 18 may be bonded to one another using one or more layers of phenolic loaded scrim cloth or felt material disposed in the gaps 20 between adjacent blocks, such as illustrated. Phenolic volatiles are removed from the scrim cloth or felt in the bond gaps 20 when all three layers 12, 14, 16 are carbonized to remove phenolic volatiles from the middle layer 16. The scrim cloth or felt material used should be of a similar chemical nature as the insulating second material (e.g. if the insulating second material is carbon foam, carbon scrim cloth or felt should be used). As an alternative, a low temperature adhesive in combination with one or more layers of scrim cloth may be used to bond the blocks 18 to one another. If a low temperature adhesive is used, then no high temperature processing is necessary, but the use of a low temperature adhesive to bond adjacent blocks 18 is limited to lower temperature applications of the heat shield 10 wherein the heat shield 10 will not be heated to the point that the low temperature adhesive breaks down forming gases that could contaminate the spacecraft structure. There are advantages to each of the techniques for bonding adjacent blocks 18. Using one or more layers of scrim cloth or felt material in the gaps 20 to bond the blocks 18 facilitates enhanced load transfer between adjacent blocks 18. Also, the charred phenolic resin remaining in the gaps 20 is porous and thus reduces thermal conductivity along the gaps 20. Using a low temperature adhesive isolates each of the blocks 18 and also provides for low thermal conductivity along the bond gaps 20 between adjacent blocks 18.

The outer layer 12 of carbon-carbon bonded with the inner layer 14 of insulating carbon foam by the middle layer 16 of carbon scrim cloth provides an integral lightweight heat shield 10 that is able to withstand severe re-entry environments. In order to provide attachment points through the heat shield 10, carbon-carbon blocks may be bonded to the outer layer 12 at desired attachment locations or the carbon-carbon outer layer 12 may be locally thickened at the attachment locations. Both the bonded carbon-carbon blocks and the locally thickened outer layer 12 concepts provide good structural strength.

While the outer, inner and middle layers 12, 14, 16 may be comprised of various appropriate ablative, insulating and scrim cloth or felt materials such as summarized above, the three layers are preferably comprised of materials having similar coefficients of thermal expansion and chemical composition. For example, the three layers may be comprised of carbonaceous materials such as carbon-carbon laminate, carbon scrim cloth, and carbon foam. As another example, the three layers may be comprised of ceramic materials, such as ceramic matrix composite, ceramic scrim cloth and ceramic foam.

Figure 4:
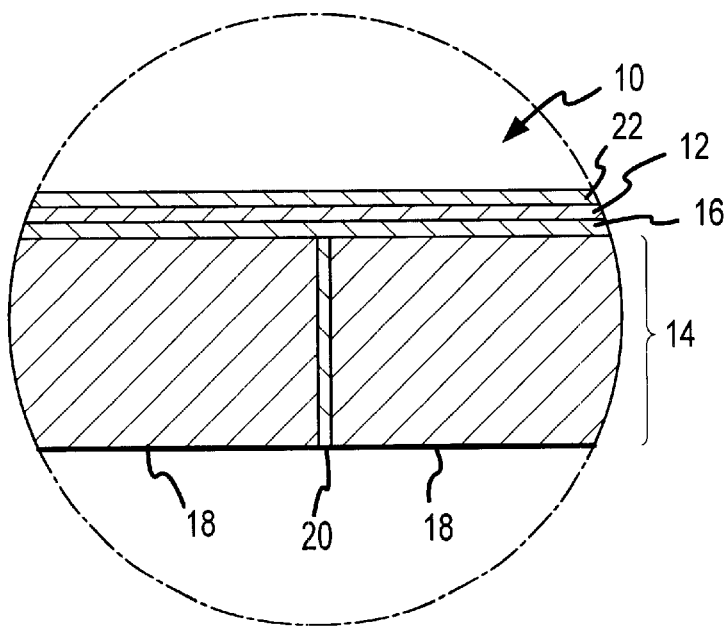
FIG. 4 illustrates a detailed cross-sectional view of the heat shield taken at enlarged area 4 in FIG. 2 wherein the outer heat resistant layer includes an oxidation resistant layer deposited thereon.

Referring now to FIG. 4, to further enhance the ability of the heat shield 10 to withstand severe reentry environments, the outer layer 12 of the heat shield 10 may have an oxidation resistant coating 22 deposited on an outer surface thereof. For example, when the outer layer 12 of the heat shield 10 comprises carbon-carbon, the oxidation resistant layer may comprise a thin layer of silicon carbide. It will be appreciated that the oxidation resistant layer 24 may comprise other appropriate oxidation resistant materials known in the art, such as for example, $MoSi_2$, amorphous SiCN, amorphous SiCBN, $Ti_3SiC_2$, HfC, $HfO_2$, $HfB_2$, Ir, or $ZrB_2$.

Typically, a heat shield 10 such as described above is configured for attachment to a separate structural component. Attachment of the heat shield 10 to a separate structural component may, for example, be accomplished using phenolic loaded scrim cloth or felt material in a manner similar to that used to bond the outer and inner layers 12, 14 together. In such instances, the heat shield 10 functions only as a thermal protection system and relies upon the separate structural component for structural strength. However, when appropriately constructed, the heat shield 10 may function as a combined thermal protection system and structure. For example, the inner insulating layer 14 may include honeycomb cores of high temperature carbon or ceramic. Such honeycomb cores may provide the heat shield 10 with sufficient structural strength such that the heat shield 10 need not be attached to a separate structural component.

Figure 5:
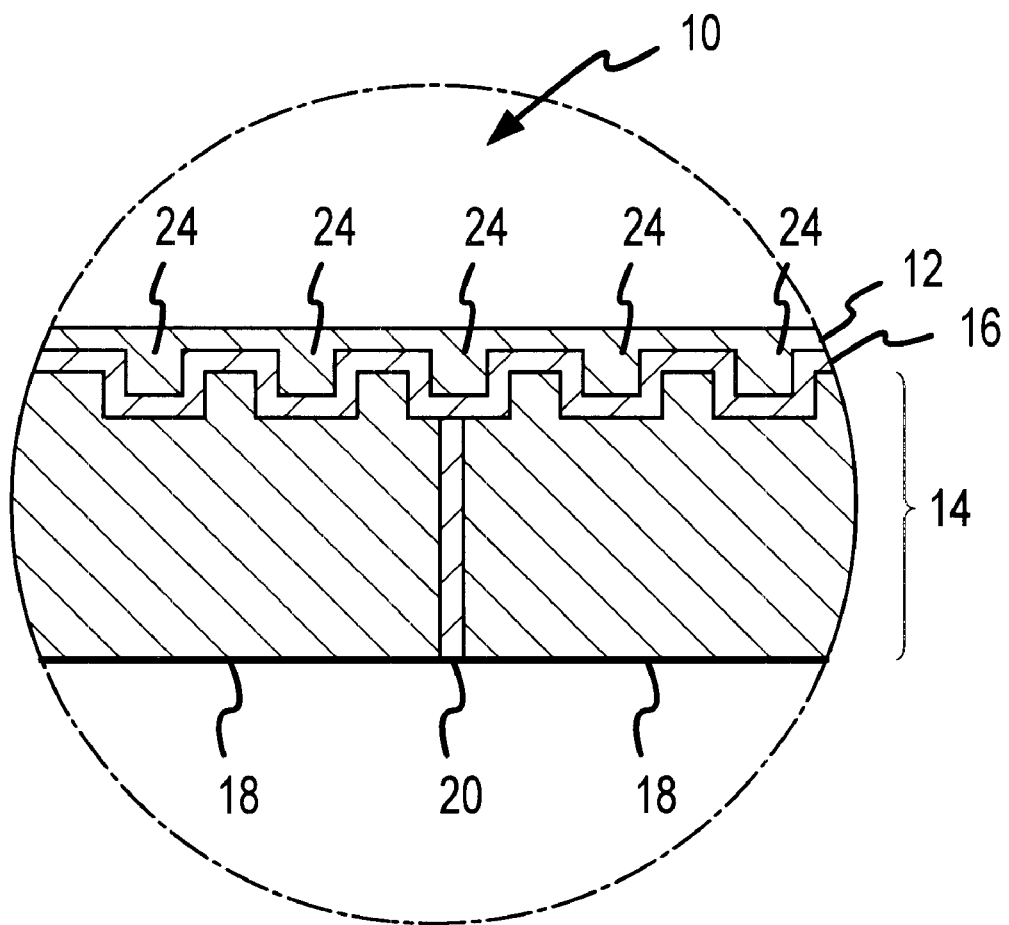
FIG. 5 illustrates a detailed cross-sectional view of the heat shield taken at enlarged area 4 in FIG. 2 wherein the outer heat resistant layer is configured to include a plurality of structural ribs on an inner surface thereof.

FIG. 5 shows another example wherein the heat shield 10 is configured to provide a thermal protection system with adequate independent structural strength. In FIG. 5, the heat shield 10 includes an ablative outer layer 12 bonded to an insulating inner layer 14 by a middle layer 16 of phenolic loaded scrim cloth or felt material. The outer layer 12 includes a plurality of ribs 24 formed on an inner surface thereof. The ribs 24 stiffen the outer layer 12 thereby obviating the need to attach the heat shield 10 to a separate structural component.

Figure 6:
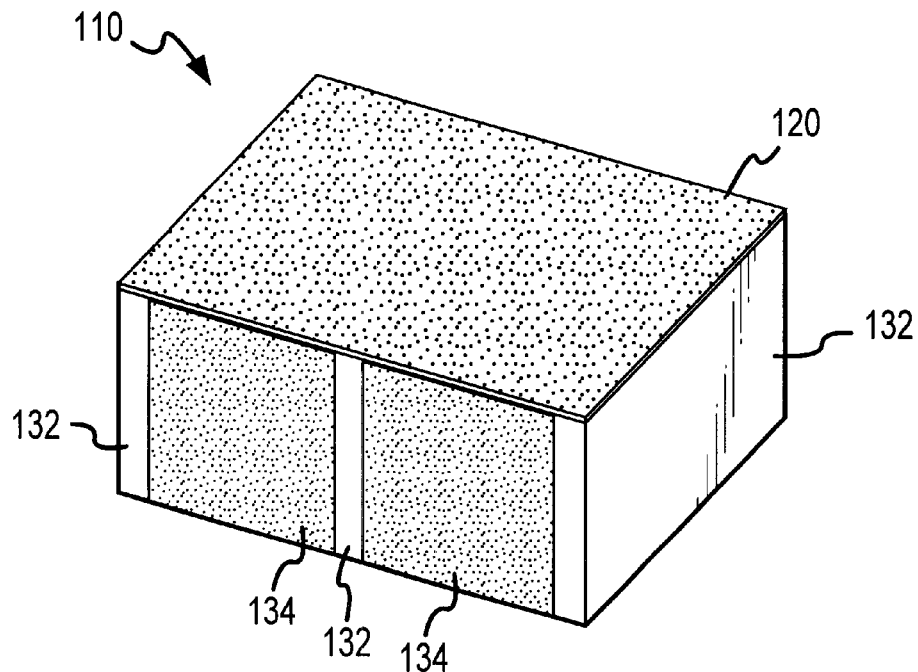
FIG. 6 illustrates a perspective view of one embodiment of a lightweight insulating sandwich tile in accordance with the present invention.
Figure 7:
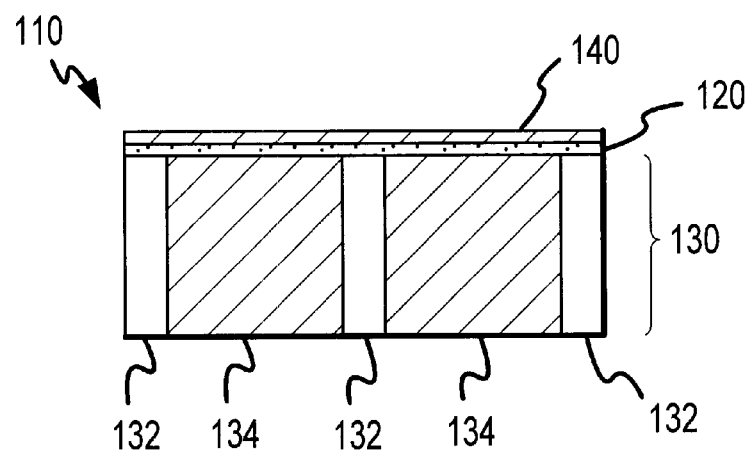
FIG. 7 illustrates a side cross-sectional view of the lightweight insulating sandwich tile of FIG. 6.

Referring now to FIGS. 6 and 7 there are shown perspective and side cross-sectional views of one embodiment of a modular lightweight insulating sandwich tile 110 in accordance with the present invention. The modular lightweight insulating sandwich tile 110 includes an outer structural facesheet 120 attached to an inner insulating core 130. The outer structural facesheet 120 is comprised of an ablative first material. The ablative first material comprising the outer facesheet 120 may, for example, be carbon-carbon (C—C). The C—C outer facesheet 120 may be fabricated as a single-ply, or it may be it may be laid-up into a quasi iso-tropic configuration in order to provide more uniform structural properties in the plane of the facesheet. The C—C outer facesheet 120 is attached to the inner insulating core 130. In this regard, the C—C outer facesheet 120 may be bonded to the inner insulating core 130 (e.g., using a phenolic loaded scrim cloth bonding process as previously described) or co-cured with the insulating core 130.

In order to protect the relatively thin outer facesheet 120 from undergoing significant oxidization during use (e.g., during atmospheric reentry), the outer surface of the outer facesheet 120 may have on oxidation resistant layer 140 thereon. The oxidation resistant layer 140 may comprise a coating or a surface treatment of an appropriate oxidation resistant, high temperature capable material. Appropriate materials for the oxidation resistant layer 140 include $MoSi_2$, amorphous SiCN, amorphous SiCBN, $Ti_3SiC_2$, HfC, $HfO_2$, $HfB_2$, SiC, Ir, or $ZrB_2$.

The inner insulating core 130 is designed to satisfy both thermal and mechanical requirements. Important thermal and mechanical requirements include high temperature capability, low thermal conductivity, low density, good compressive strength, high toughness and resistance to fatigue (e.g., fatigue due to launch vibrations). In this regard, the inner insulating core 130 may be comprised of lightweight insulating materials such as, for example, carbon FIBERFORM® (bonded discontinuous carbon fibers), graphite felt (flexible fiber mats), carbon aerogel, and carbon foam (network of vitreous carbon ligaments). Table 1 below summarizes typical material properties including density, thermal conductivity, coefficient of thermal expansion and compressive mechanical properties for carbon FIBERFORM® (referred to as "C-Fiberform" in Table 1), graphite felt (referred to as "Gr-Felt" in Table 1), carbon aerogel (referred to as "C-Aerogel" in Table 1), and carbon foam (referred to as "C-Foam" in Table 1).

The typical properties listed in Table 1 for carbon FIBERFORM®) and graphite felt were obtained from Product Data Sheets from Fiber Materials, Inc. (FMI) of Biddeford, Me. The typical properties listed in Table 1 for carbon aerogel were obtained from S. Crown and R. Thompson, "Carbon Aerogel Thermal Protection System for Reusable Launch Vehicles", a technical paper published by the Southern Research Institute of Birmingham, Ala., and from a Data Table on Aerogel Products from MarkeTech International of Port Townsend, Wash. The typical properties listed in Table 1 for carbon foam were obtained from Reticulated Vitreous Carbon Datasheet from ERG Aerospace of Oakland, Calif.

As may be appreciated, in order to take advantage of certain material properties, the inner insulating core 130 may be comprised of a hybrid combination of materials such as those listed in Table 1. For example, since graphite felt has very low thermal conductivity but relatively high density and relatively low strength, whereas carbon aerogel has relatively high compressive strength and relatively low thermal conductivity and density, it may be desirable to combine graphite felt with carbon aerogel in the inner insulating core 130. It will be further appreciated that the insulating materials listed in Table 1 (which are either carbon or graphite based) are expected to each provide a relatively low coefficient of thermal expansion (CTE) that is compatible with the CTE of the C—C facesheet 120.

As is shown in FIGS. 6 and 7, the inner insulating core 130 of the modular lightweight insulating sandwich tile 110 may include a plurality of support panels 132. The purpose of the support panels 132 is to enhance the structural integrity (e.g., provide shear resistance) of the modular lightweight insulating sandwich tile 110. In this regard, each tile 110 may include three generally parallel support panels 132 that are oriented substantially orthogonal to the outer facesheet 120. One support panel 132 may be disposed on a left end of the modular lightweight insulating sandwich tile 110, the second support panel 132 may be disposed on a right end of the modular lightweight insulating sandwich tile 110, and the third support panel 132 may be generally centered between the left and right ends of the lightweight insulating sandwich tile 110. There are two sections 134 of lightweight insulating material (e.g., carbon aerogel and/or graphite felt) between the left and center and center and right support panels 132. The support panels may, for example, be comprised of carbon foam, carbon FIBERFORM®, or carbon-carbon.

The modular lightweight insulating sandwich tile 110 offers a modular approach to providing thermal protection in a number of applications, including use in heat shields for spacecraft and reusable launch vehicles, rocket thruster nose-cones, and furnace insulation. A plurality of lightweight insulating sandwich tiles 110 may be applied where needed making the tiles 110 an attractive candidate for replacement, repair or upgrade uses. In space vehicle applications, the lightweight insulating sandwich tile 110 also provides a lightweight, highly insulative capability at the surface of the vehicle reducing the requirement for inner

TABLE 1

| Material | Density $g/cm^3$ | Thermal Conductivity W/m $°$ K. (@T) | Coefficient Of Thermal Expansion, ppm/$°$ C. (@T) | Compressive Mechanical Properties |
|---|---|---|---|---|
| C-Fiberform | 0.19 | 0.17 (50° C.) | 1.3 (20–400° C.) 2.9 (400–1000° C.) | 0.2 MPa (Strength) |
| Gr-Felt | 0.23 ($g/cm^2$) | 0.069 (50° C.) | Not reported; 0% linear shrinkage | 0.06–0.09 MPa (Tensile Strength) |
| C-Areogel | 0.09–0.6 | 0.12–0.4 | Not reported | 14.8 MPa (Strength; 0.25 $g/cm^3$) 3 GPa (Modulus; 0.6 $g/cm^3$) |
| C-Foam | 0.05 | 0.19 (1650° C.) 0.52 (2760° C.) (vacuum) | 2.2 (−1–93° C.) 3.2 (93–982° C.) | 0.28–0.48 MPa (Compressive Strength) 0.17–0.35 MPa (Tensile Strength) 31–62 MPa (Modulus) | insulation requirements, such as conventional MLI blankets, achieving reductions in TPS sub-system weight. It will be appreciated that in addition to the rectangular configuration shown in FIGS. 6 and 7, the modular lightweight insulating sandwich tile 110 may be fabricated in other configurations as well depending upon its intended application.

While various embodiments of the present invention have been described in detail, it is apparent that further modifications and adaptations of the invention will occur to those skilled in the art. However, it is expressly understood that such modifications and adaptations are within the spirit and scope of the present invention.

What is claimed is:

1. A lightweight insulating sandwich tile comprising:
    a structural facesheet comprising an ablative first material;
    an inner insulating core attached to an inner surface of said structural facesheet, wherein said inner insulating core comprises carbon aerogel as an insulating second material; and
    one of an oxidation resistant coating and an oxidation resistant surface treatment on an outer surface of said structural facesheet, wherein said one of an oxidation resistant coating and an oxidation resistant surface treatment is $MoSi_2$, amorphous SiCN, amorphous SiCBN, $Ti_3SiC_2$, HfC, $HfO_2$, $HfB_2$, Ir, or $ZrB_2$.

2. The lightweight insulating sandwich tile of claim 1 wherein said ablative first material comprises a carbon-carbon matrix.

3. The lightweight insulating sandwich tile of claim 2 wherein said carbon-carbon ablative first material is laid-up in a single ply configuration.

4. The lightweight insulating sandwich tile of claim 2 wherein said carbon-carbon ablative first material is laid-up in a quasi-isotropic configuration.

5. The lightweight insulating sandwich tile of claim 1 wherein said structural facesheet and said inner insulating core are bonded to one another.

6. The lightweight insulating sandwich tile of claim 5 wherein said structural facesheet and said inner insulating core are bonded to one another by disposing at least one layer of one of a phenolic loaded third material therebetween and applying heat to remove phenolic volatiles, wherein said third material is scrim cloth or felt.

7. The lightweight insulating sandwich tile of claim 1 wherein said structural facesheet and said inner insulating core are co-cured to attach said structural facesheet and said inner insulating core to one another.

8. The lightweight insulating sandwich tile of claim 1 wherein said inner insulating core includes a plurality of support panels comprised of a third material, wherein said third material is carbon-carbon, bonded discontinuous carbon fibers, or a network of vitreous carbon ligaments.

9. The lightweight insulating sandwich tile of claim 8 wherein each of said plurality of support panels is oriented in a parallel fashion to one another and substantially orthogonal to said structural facesheet.

10. The lightweight insulating sandwich tile of claim 9 wherein said inner insulating core includes a plurality of insulating sections between said support panels, said insulating sections being comprised of a fourth material, wherein said fourth material is carbon aerogel or graphite felt.

11. A lightweight insulating sandwich tile comprising:
    an outer structural facesheet comprising carbon-carbon;
    an inner insulating core backing said outer structural facesheet, said inner insulating core comprising carbon aerogel; and
    one of an oxidation resistant coating and an oxidation resistant surface treatment on an outer surface of said structural facesheet.

12. The lightweight insulating sandwich tile of claim 11 wherein said outer structural facesheet comprises a single ply lay-up of a carbon-carbon matrix.

13. The lightweight insulating sandwich tile of claim 11 wherein said outer structural facesheet comprises a quasi-isotropic lay-up of a carbon-carbon matrix.

14. The lightweight insulating sandwich tile of claim 11 wherein said one of an oxidation resistant coating and an oxidation resistant surface treatment is $MoSi_2$, amorphous SiCN, amorphous SiCBN, $Ti_3SiC_2$, HfC, $HfO_2$, $HfB_2$, SiC, Ir, or $ZrB_2$.

15. The lightweight insulating sandwich tile of claim 11 wherein said outer structural facesheet and said inner insulating core are attached to one another.

16. The lightweight insulating sandwich tile of claim 15 wherein said outer structural facesheet and said inner insulating core are bonded to one another by disposing at least one layer of a phenolic loaded carbon material therebetween and applying heat to remove phenolic volatiles, wherein said phenolic loaded carbon material is carbon scrim cloth or carbon felt.

17. The lightweight insulating sandwich tile of claim 15 wherein said outer structural facesheet and said inner insulating core are attached one another by co-curing the outer structural facesheet and the inner insulating layer.

18. The lightweight insulating sandwich tile of claim 11 wherein said inner insulating core includes a plurality of support panels comprised of a material selected from the group consisting of carbon-carbon, bonded discontinuous carbon fibers, and a network of vitreous carbon ligaments.

19. The lightweight insulating sandwich tile of claim 18 wherein each of said plurality of support panels is oriented in a parallel fashion to one another and substantially orthogonal to said outer structural facesheet.

20. The lightweight insulating sandwich tile of claim 19 wherein said inner insulating core includes a plurality of insulating sections between said support panels, said insulating sections being comprised of a material selected from the group consisting of carbon aerogel and graphite felt.

* * * * *